United States Patent [19]
Martin et al.
[11] 4,077,431
[45] Mar. 7, 1978

[54] SERVO-OPERATED REGULATOR VALVE

[75] Inventors: Louis Emile Martin, Senlis; Antoine Theodore Mauboussin, Montfermeil, both of France

[73] Assignee: Societe Anonyme Poclain Hydraulics, Verberie, France

[21] Appl. No.: 732,435

[22] Filed: Oct. 14, 1976

[30] Foreign Application Priority Data

Oct. 22, 1975 France ............................ 75 32371

[51] Int. Cl.$^2$ ..................... F16K 11/00; F15B 13/044

[52] U.S. Cl. ......................... 137/596.14; 137/596.16; 91/459

[58] Field of Search ..................... 137/596.14, 596.16, 137/596.2, DIG. 2; 91/453, 459

[56] References Cited

U.S. PATENT DOCUMENTS

| | | | |
|---|---|---|---|
| 3,113,432 | 12/1963 | Watson | 137/596.16 X |
| 3,554,086 | 1/1971 | Wills | 91/459 X |
| 3,934,610 | 1/1976 | Solie | 137/596.16 X |

*Primary Examiner*—Edgar W. Geoghegan
*Attorney, Agent, or Firm*—Mason, Fenwick & Lawrence

[57] ABSTRACT

A servo-operated fluid flow control valve includes a valve body housing a main valve which defines with the body an inlet chamber, an exhaust chamber, and a control chamber. An auxiliary valve is interposed between the control and exhaust chambers and is movable relative to the main valve by a jack controlled by a regulator. The arrangement is such that when the auxiliary valve is closed, the inlet and control chambers are in communication, and when the auxiliary valve is open, the control and exhaust chambers are in communication while the inlet and control chambers are isolated from each other.

3 Claims, 1 Drawing Figure

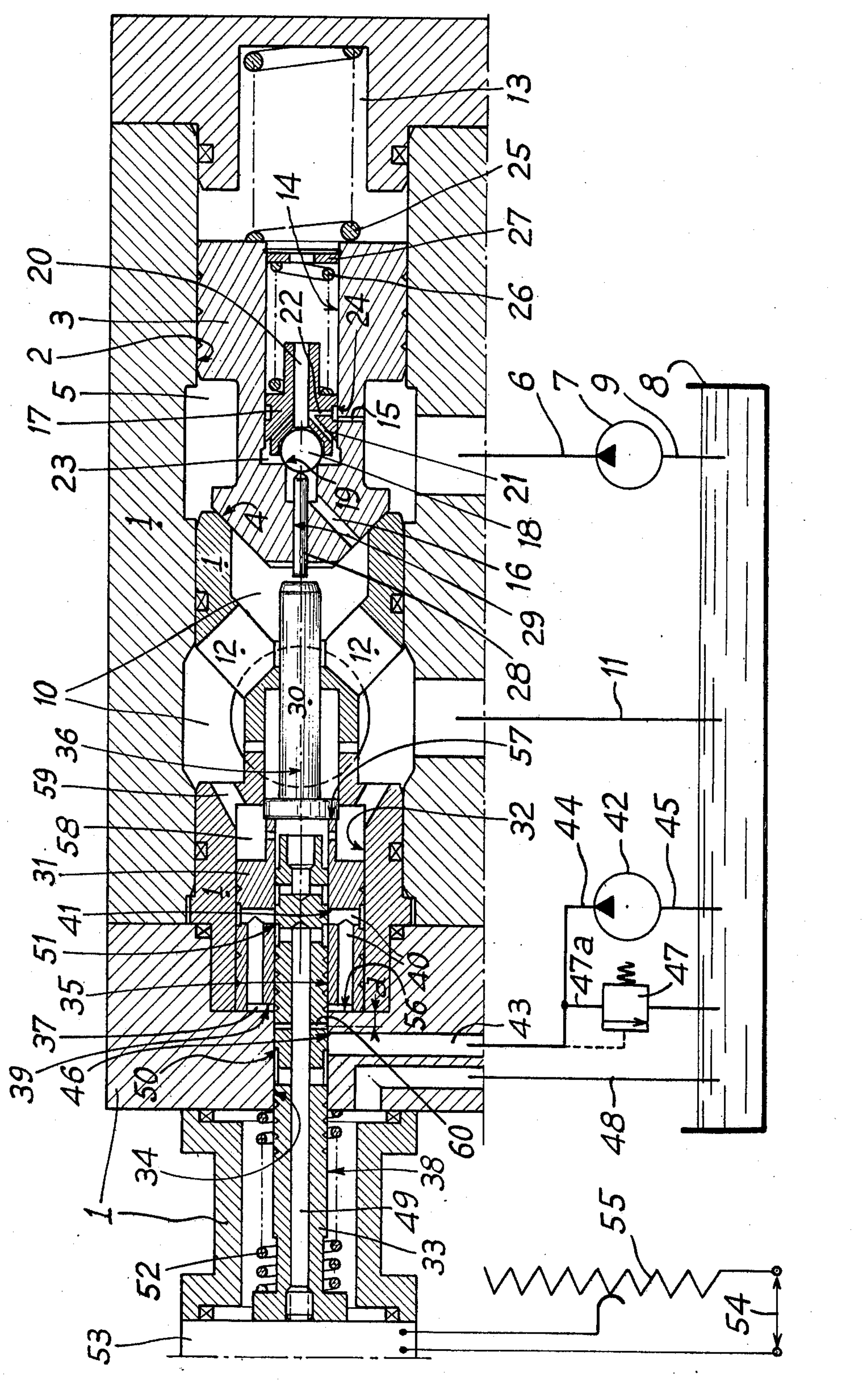

SERVO-OPERATED REGULATOR VALVE

This invention relates to fluid regulator valves intended for the control of large flows and high pressures.

A conventional regulator valve includes a body and a movable part which defines three chambers in the body. Opening is effected by a jack which is fed by a fourth chamber. In this construction, two of the said three chambers are in permanent communications, so that the force from the operating jack must be sufficient to overcome the force of the feed pressure across the whole sealing area of the valve.

Servo-operated regulator valves are known which include the features mentioned above except that the two chambers aforesaid communicate only through a diaphragm and one of these two chambers and the third of the three chambers can communicate through a small servo-operated valve which requires only a very small driving force in relation to the force for driving the main valve.

This enables valves to be built which operate at high pressures by employing servo-operations which represent only a twentieth or a fiftieth of the force for seating the main valve.

The disadvantage of these various valves is that in the majority of hydraulic circuits employing them, the pressure retained in the one of the three chambers depends upon the opening of the valve. Now, when this pressure varies, the pressures in the other two of the three chambers also vary so that the force on the operating piston is very variable for one and the same position of the valve.

This is not a disadvantage so long as the valve is only required to be in "open" or "closed" positions. But is unacceptable if it is required to maintain the valve in an intermediate position with very different pressures in the three said chambers, in other words, if it is required to have progressiveness of opening.

According to the present invention there is provided a fluid regulator valve comprising: a valve body defining a valve seat; a main valve capable of bearing against the seat and defining in the body an inlet chamber for inlet of a fluid under pressure, an exhaust chamber which as a function of its position the main valve puts into direct communication with or isolates from the inlet chamber, and a control chamber for control of the position of the main valve capable of containing a fluid the pressure of which has an effect tending to keep the main valve bearing against its seat; an auxiliary valve interposed between the control chamber and the exhaust chamber and movably with respect to the main valve, an operating jack the piston of which defines a master chamber and which, when the master chamber is fed with an operating fluid, sets in motion the opening of the auxiliary valve to which it is coupled; means defining an operating chamber for containing an operating fluid; and an operating regulator which selectively puts the master chamber in communication with the operating chamber or with a tank of fluid not under pressure, the arrangement being such that when the auxiliary valve is in its closed position the inlet chamber and the control chamber are in communication and when the auxiliary valve is in its open position, the control chamber and the exhaust chamber are in communication and said communication between the inlet chamber and the control chamber is blocked.

Advantageously the operating regulator consists of an operating slide which when it is displaced into an intermediate position lying between its rest position and a predetermined limiting position puts into communication the operating and master chambers by way of ducts internal to the movable chamber of the jack and to the said operating slide and of ports of limited widths capable of letting these internal ducts communicate, whilst for a displacement of the operating slide beyond the limiting position this slide establishes direct communication between the operating and master chambers, controlling the jerk so that its movable member is coupled not only to the auxiliary valve but also to the main valve which it thrusts directly and raises from its seat.

Preferably a control slide integral in translation with a ball constituting the auxiliary valve proper is mounted to slide in a bore internal to the main valve and is provided with ducts connecting the control chamber to an orifice capable of opening out opposite a hole arranged in the main valve and connecting the inlet chamber to the said bore, the ball being itself capable of blocking a hole for communication between the control and exhaust chambers.

The invention will be better understood and secondary characteristics and their advantages will become apparent during the course of the description of an embodiment given below by way of example. It is to be understood that the description and the drawing are given by way of indication and non-restrictively.

Reference will be made to the drawing attached in which the single FIGURE is a section through a valve in accordance with the invention.

The composite valve illustrated comprises a valve body 1 inside which is mounted to slide in a bore 2 a main valve 3 which in the case in point bears tightly against a seat 4 integral with the body 1. The main valve 3 defines in the body 1:

a chamber 5 for inlet of the fluid contained in the delivery pipe 6 from a pump 7, connected to a tank 8 by its suction pipe 9;

an exhaust chamber 10 which is connected to the tank 8 by a pipe 11, passages 12 enabling free communication between the two portions of the exhaust chamber 10;

and a control chamber 13.

In the closed configuration shown, the main valve 3 is isolating from one another the inlet 5 and exhaust 10 chambers. On the other hand, when separated from its seat 4 it would put these two chambers into direct communication.

It is to be observed that the main valve 3 has an internal bore 14 which opens out into the control chamber 13 and is provided with a first hole 15 and a second hole 16 which are permanently in communication with the inlet 5 and exhaust 10 chambers respectively.

A slide 17 slides in the bore 14 and is coupled in translation to a ball 18 for blocking an orifice 19 in the main valve 3, which is in communication with the duct 16. The slide 17 has internal ducts 20, 21, 22 which communicate: the duct 20 with the control chamber 18, the duct 21 with the duct 20 and with the chamber 28 defined by the front face of the slide 17 and the ball 18 and capable of communicating with the orifice 19 when the said ball 18 is not blocking the said orifice 19, and the duct 22 with the duct 20 whilst opening through a neck 24 into the bore 14.

It is to be observed that with the position of blocking of the orifice 19 by the ball 18 corresponds the coincidence of the neck 24 and the hole 15, whereas when the orifice 19 is no longer blocked there is no longer any communication between the neck 24 and the hole 15.

A spring 25 tends to keep the main valve 3 bearing against its seat 4 whilst a spring 26 bearing against a removable washer 27 made integral with the main valve 3, tends to keep the ball 18 bearing to block the orifice 19.

Finally, a little pushrod 28 is mounted to slide in a guide-bore 29 in the main valve 3 so as to be able to thrust against the ball 18 when a large pushrod 30 which in turn is mounted to slide in the body 1 coaxially with the pushrod 28 thrusts against the latter pushrod.

Furthermore the piston 31 of a jack, too, is mounted to slide inside the body 1 in a bore 32, just as an operating slide 33 is mounted to slide in a bore 34 in the body 1 and in a bore 35 in the piston 31, the bores 32, 34 and 35 all being coaxial (axis 36) with the little pushrod 28.

The piston 31 defines in the body 1 a master chamber 37 which communicates with the cylindrical face 38 of the slide 33, on the other hand directly in the zone defined by the axial face 39 of the piston 31, and on the other hand indirectly through internal ducts 40 connecting the said axial face 39 to an orifice 41 opening out beyond this axial face into the cylindrical face 38 of the slide 33.

An operating pump 42 is connected to an operating chamber 43 arranged in the body 1 through its delivery pipe 44, and is connected to the tank 8 by its suction pipe 45. The operating chamber 43 opens out into the bore 34 through an orifice 46. Furthermore a pipe 48 connects the chamber containing a spring 52 defined below to the tank 8. A calibrated relief valve 47 is tapped off by a pipe **47*a* from the delivery pipe 44**.

The operating slide 33 includes moreover an internal duct 49 which communicates with necks 50 and 51 which open out into the cylindrical face 38; it is returned to the position called the "rest" position by a spring 52 and is coupled to an electromagnet 53 the action of which, when it is excited, is opposed to that of the spring 52.

This electromagnet 53 is fed in a conventional manner by a source of electrical energy 54 with a member 55 interposed for adjustment of the strength of the current and hence of the strength of the electromagnet.

In its "rest" position the slide 33 establishes communication between the orifice 46 and the neck 50. The chamber 37 is not fed with fluid under pressure, so that the piston 31 is pushed right back and is not acting on the pushrod 30. A hole 60 for communication between the duct 9 and the face 38 is then arranged at a distance *d* from the axial face 56 of the body 1, which defines the chamber 37.

When the slide 33 is displaced so that the neck 50 is not directly in communication with the chamber 37 the neck 51 nevertheless enters into communication with the orifice 41, whilst the neck 50 is no longer in communication other than with the orifice 46. Thus the chamber 37 through the ducts 49 and 40 is fed with fluid under pressure until the displacement of the piston 31 is sufficient for the orifice 41 to be blocked again by the solid portion of the cylindrical face 38.

When at last the hole 60 connecting the duct 49 to the face 38 reaches the face 56 and is then in communication with the chamber 37 whilst remaining in communication with the orifice 46, the chamber is fed with fluid under pressure and remains so, whatever the relative position of the piston 31 with respect to the slide 33.

It is to be observed again the one end 57 of the piston 31 is arranged opposite the pushrod 30 against which it is capable of coming to bear, the chamber 58 defined by the said piston and opposite to the chamber 37 communicating freely through ducts 59 with the exhaust chamber 10.

The operation of the composite valve which has just been described will now be explained.

During progressive opening of the valve 3 the electromagnet 53 is fed at a certain voltage with which corresponds a certain force from this electromagnet, which is balanced by the opposing force of compression of the spring 52. The slide 33 is displaced by a translation less than the distance *d*. The chamber 37 is fed and the piston is displacd until the orifice 41 passes beyond the neck 51 and thrusts back the pushrod 30 which acts upon the pushrod 28 which in turn thrusts back the ball 18 and the control slide 17. The latter interrupts communication between the chamber 5 and the chamber 13, this last being in addition put into communication through the ducts 20 and 21 and the hole 16 with the chamber 10. Hence the pressure in the chamber 13 falls whereas the pressure in the chamber 5 is maintained and is sufficient to cause opening of the main valve 3. When the valve 3 has moved back sufficiently, the neck 24 is again arranged facing the hole 15, so that the pressure rises again in the chamber 13. A new position of stable equilibrium of the main valve 3 has been reached, which is independent of the pressure in the chamber 5, this being so even if the opening of the said main valve is small.

In order to obtain complete and rapid opening of the main valve 3 it is sufficient to excite the electromagnet 53 more in order to let the hole 60 and the chamber 37 communicate directly. The piston 31 then bears hard by its end 57 against the pushrod 30 which in turn thrusts back as well the ball 18 and the slide 17 of the main valve 3 itself until the latter is opened completely.

At closing, cutting off the excitation from the elctromagnet 53 lets the spring 52 act and bring the slide 33 back towards its rest position. The piston 31 no longer bears against the pushrods 30 and 28, so that the main valve 3 is reclosed under the action of the spring 25, and the ball 18 blocks the orifice 19 again under the action of the spring 26.

Naturally closure is partial or total, according to whether the excitation of the electromagnet 53 is partially or totally cut off.

In short, the servo-operation of the opening of the main valve 3 is carried out in two different and successive ways by means of the same master member which is the electromagnet 53 compressing the spring 52.

The first way of servo-operation is a control subordinated to position. This subordination is achieved by the piston 31, feeding of the chamber 37 being effected through the slide 33 which is balanced axially, which imposes a position on the piston 31.

After a certain predetermined stroke (*d*) the chamber 37 is fed at pressure which is constant and sufficient for opening the valve rapidly up to its maximum position. In the reverse direction, closure is effected rapidly for one portion of the stroke and in a controlled and stable fashion for the portion which corresponds with progressive operation.

The invention is not limited to the embodiment described, but on the contrary covers any variants which might be applied to it without departing from its scope or spirit as set forth in the claims.

What we claim

1. A fluid regulator valve comprising:

a valve body defining a valve seat;

a main valve capable of bearing against the seat and defining in the body an inlet chamber for inlet of a fluid under pressure, an exhaust chamber which as a function of its position the main valve puts into direct communication with or isolates from the inlet chamber, and a control chamber for control of the position of the main valve capable of containing a fluid the pressure of which has an effect tending to keep the main valve bearing against its seat;

an auxiliary valve interposed between the control chamber and the exhaust chamber and movably with respect to the main valve;

an operating jack the piston of which defines a master chamber and which, when the master chamber is fed with an operating fluid, sets in motion the opening of the auxiliary valve to which it is coupled; means defining and operating chamber for containing an operating fluid; and an operating regulator which selectively puts the master chamber in communication wih the operating chamber or with a tank of fluid not under pressure, the arrangement being such that when the auxiliary valve is in its closed position the inlet chamber and the control chamber are in communication and when the auxiliary valve is in its open position, the control chamber and the exhaust chamber are in communication and said communication between the inlet chamber and the control chamber is blocked.

2. A valve according to claim 1, in which the operating regulator comprises an operating slide which when it is displaced into an intermediate position lying between its rest position and a predetermined limiting position puts into communication the operating chamber and the master chamber by way of ducts internal to the movable member of the jack and to the said operating slide and of ports of limited widths capable of letting these internal ducts communicate, and which, when it is displaced beyond the limiting position, establishes direct communication between the operating chamber and the master chamber, controlling the jack so that its movable member is coupled not only to the auxiliary valve but also the main valve which it thrusts directly and raises from its seat.

3. A valve according to claim 1 in which a control slide translationally fixed to a ball constituting the auxiliary valve proper is mounted to slide in a bore internal to the main valve and is provided with ducts connecting the control chamber to a neck capable of opening out facing a hole arranged in the main valve and connecting the inlet chamber to the said bore, the ball being itself capable of blocking a hole for communication between the control chamber and the exhaust chamber.

* * * * *